United States Patent [19]

Abrams et al.

[11] Patent Number: 5,587,913
[45] Date of Patent: Dec. 24, 1996

[54] METHOD EMPLOYING SEQUENTIAL TWO-DIMENSIONAL GEOMETRY FOR PRODUCING SHELLS FOR FABRICATION BY A RAPID PROTOTYPING SYSTEM

[75] Inventors: Steven R. Abrams, New York; James U. Korein, Chappaqua; Vijay Srinivasan, Peekskill; Konstantinos Tarabanis, Flushing, all of N.Y.

[73] Assignee: Stratasys, Inc., Eden Prairie, Minn.

[21] Appl. No.: 322,401

[22] Filed: Oct. 12, 1994

Related U.S. Application Data

[63] Continuation of Ser. No. 4,038, Jan. 15, 1993, abandoned.

[51] Int. Cl.⁶ .......................... G06F 19/00; G06F 17/50; G06F 17/10
[52] U.S. Cl. .................. 364/468.26; 364/474.24; 395/120
[58] Field of Search ............... 364/474.24, 468, 364/469, 473; 395/118, 119, 120, 161

[56] References Cited

U.S. PATENT DOCUMENTS

| | | | |
|---|---|---|---|
| 4,078,229 | 3/1978 | Swainson et al. | 340/173 CM |
| 4,238,840 | 12/1980 | Swainson | 365/119 |
| 4,247,508 | 1/1981 | Housholder | 264/219 |
| 4,333,165 | 6/1982 | Swainson et al. | 365/120 |
| 4,575,330 | 3/1986 | Hull | 425/174.4 |
| 4,665,492 | 5/1987 | Masters | 364/468 |
| 4,710,253 | 12/1987 | Soszek | 156/272.8 |
| 4,734,021 | 3/1988 | Maddock | 425/60 |
| 4,749,347 | 6/1988 | Valavaara | 425/135 |
| 4,752,352 | 6/1988 | Feygin | 156/630 |
| 4,752,498 | 6/1988 | Fudim | 425/174.4 |
| 4,801,477 | 1/1989 | Fudim | 427/54.1 |
| 4,844,144 | 7/1989 | Murphy et al. | 164/35 |
| 4,857,694 | 8/1989 | Doyle et al. | 219/76.12 |
| 4,915,757 | 4/1990 | Rando | 156/64 |
| 4,943,928 | 7/1990 | Campbell et al. | 364/477 |
| 4,961,154 | 10/1990 | Pomerantz et al. | 364/522 |
| 4,961,886 | 10/1990 | Eckstein et al. | 264/22 |
| 4,977,511 | 12/1990 | Gottschalk et al. | 364/473 |
| 5,031,120 | 7/1991 | Pomerantz et al. | 364/522 |
| 5,038,014 | 8/1991 | Pratt et al. | 219/121.64 |
| 5,059,266 | 10/1991 | Yamane et al. | 156/64 |
| 5,121,329 | 6/1992 | Crump | 364/468 |
| 5,134,569 | 7/1992 | Masters | 364/474.24 |
| 5,136,515 | 8/1992 | Helinski | 364/468 |
| 5,216,616 | 6/1993 | Masters | 364/474.24 |

FOREIGN PATENT DOCUMENTS

0250121A2  12/1987  European Pat. Off. .
WO92/08200  5/1992  WIPO .

OTHER PUBLICATIONS

T. Wholers, "Chrysler Compares Rapid Prototyping Systems", Computer–Aided Engineering, Oct. 1992, pp. 84–90.
S. Ashley, "Rapid Prototyping Systems", Mechanical Engineering, Apr. 1991, pp. 34–43.
S. Ashley, "Rapid Mold–Making For Investment Casting", Mechanical Engineering Nov., 1992, pp. 49–51.
European Search Report Feb. 25, 1994.

Primary Examiner—Joseph Ruggiero
Attorney, Agent, or Firm—Moore & Hansen

[57] ABSTRACT

Beginning with a CAD specification of an object, the method and apparatus of the invention reduces the overall time to produce a shell of the object with a rapid prototyping machine. The reduction in time is achieved by interleaving the computation and the building tasks and by not requiring an explicit evaluation of a shell of the solid at the outset. The method is shown to operate with STL data, or with other CAD data, directly, and can also be employed to create non-planar objects, such as models of sheet metal parts that are represented only as surfaces. Furthermore, the method can be employed to produce a smooth outer surface even when employing polyhedral approximations to the surfaces of the object.

10 Claims, 4 Drawing Sheets

SOLID 30

36
36 SUPPORTS
36
20
MODEL 32
LAYERS (SLICES)
34

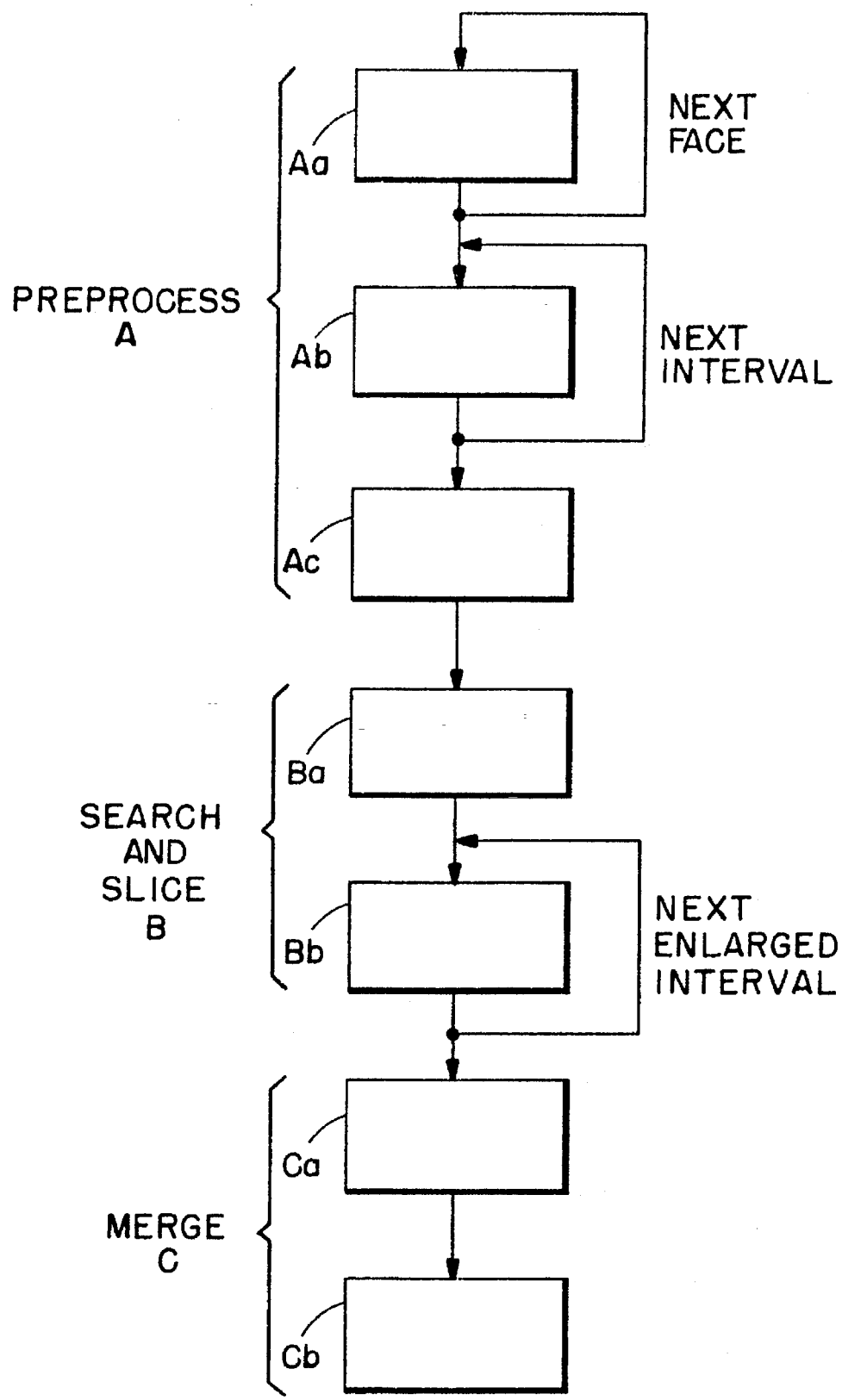

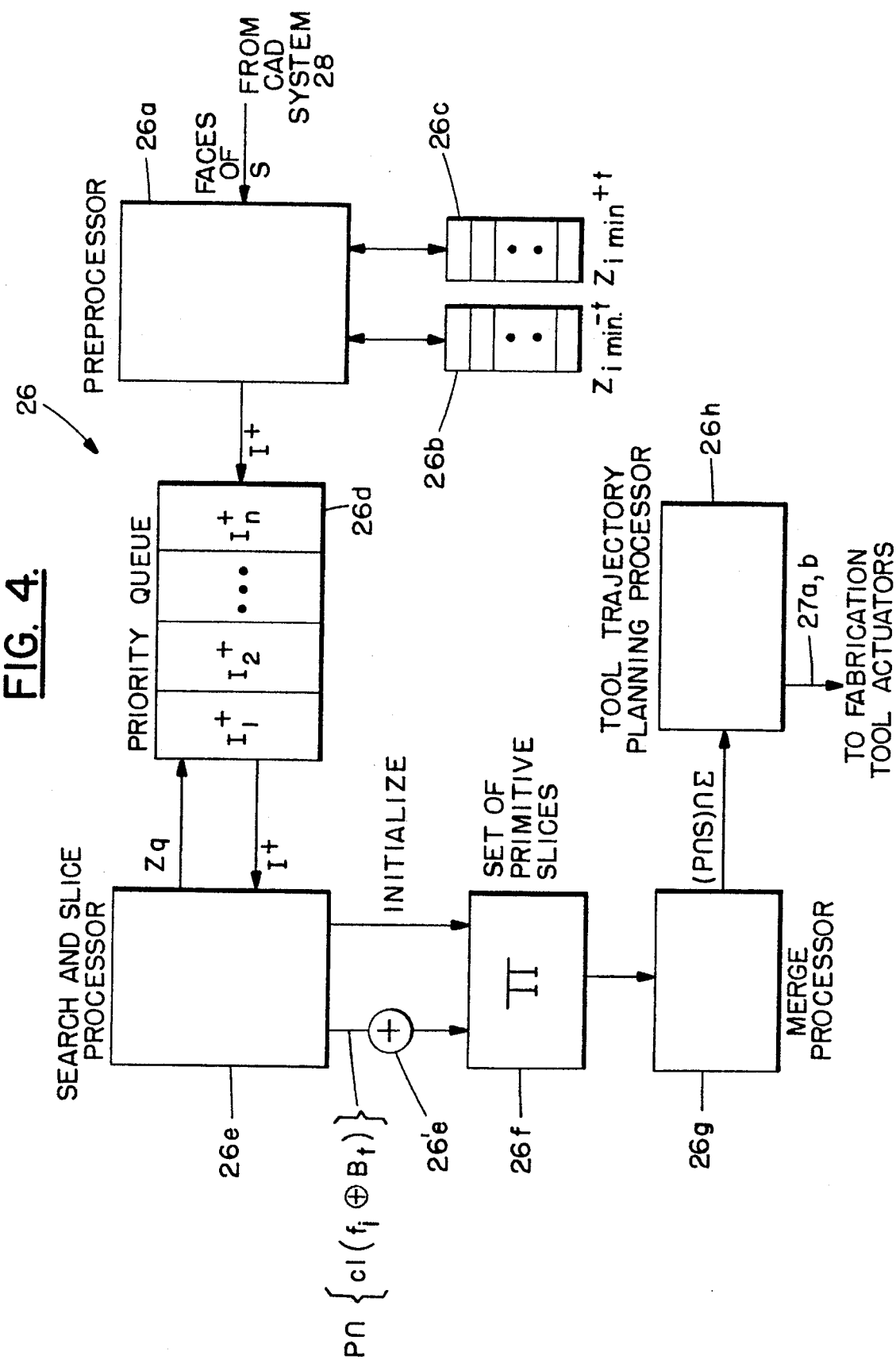

METHOD EMPLOYING SEQUENTIAL TWO-DIMENSIONAL GEOMETRY FOR PRODUCING SHELLS FOR FABRICATION BY A RAPID PROTOTYPING SYSTEM

This is a continuation of application Ser. No 08/004,038 filed on Jan. 15, 1993, abandoned.

FIELD OF THE INVENTION

This invention relates generally to rapid prototyping systems and, in particular, to methods and apparatus for processing a representation of a solid and for fabricating the processed representation.

BACKGROUND OF THE INVENTION

Many rapid prototyping machines form a solid model, such as a model of a mechanical layers of the part on top of one another. An overview of currently available rapid prototyping technologies is found in "Rapid Prototyping Report", vol. 2, CAD/CAM Publishing, Inc. (March 1992). Reference is also made to an article entitled "Rapid Prototyping Systems", Mechanical Engineering, April 1991, pps. 34–41, which describes various rapid prototyping systems, and to an article entitled "Rapid Mold-Making for Investment Casting", Mechanical Engineering, November 1992, pps. 49–51. In general, rapid prototyping encompasses several techniques, including stereolithography, selective laser sintering, solid ground curing, fused deposition modeling, laminated object manufacturing, and photosolidification.

The following U.S. Patents are exemplary of various types of computer-controlled three dimensional object fabrication systems:

U.S. Pat. No. 4,575,330, "Apparatus For Production of Three-Dimensional Objects by Stereolithography", (Hull); U.S. Pat. No. 4,665,492, "Computer Automated Manufacturing Process and System" (Masters); U.S. Pat. No. 4,734,021, "Machine For Building a Dome or Sphere" (Maddock); U.S. Pat. No. 4,749,347, "Topology Fabrication Apparatus" (Valavaara); U.S. Pat. No. 4,752,352, "Apparatus and Method For Forming An Integral Object From Laminations" (Feygin); U.S. Pat. No. 4,752,498, "Method and Apparatus For Production of Three-Dimensional Objects By Photosolidification" (Fudim); U.S. Pat. No. 4,801,477, "Method and Apparatus For Production of Three-Dimensional Objects by Photosolidification" (Fudim); U.S. Pat. No. 4,844,144, "Investment Casting Utilizing Patterns Produced By Stereolithography" (Murphy et al.); U.S. Pat. No. 4,857,694, "Method and Apparatus For Automatic Vapor Cooling When Shape Melting a Component" (Doyle et al ); U.S. Pat. No. 4,915,757, "Creation of Three Dimensional Objects" (Rando); U.S. Pat. No 5,031,120, "Three Dimensional Modelling Apparatus" (Pomerantz et al.); U.S. Pat. No. 5,038,014, "Fabrication of Components By Layered Deposition" (Pratt et al.); U.S. Pat. No. 5,059,266, "Apparatus and Method For Forming Three-Dimensional Article" (Yamane et al.); and U.S. Pat. No. 5,121,329, "Apparatus and Method For Creating Three-Dimensional Objects" (Crump).

When fabricating a solid model of an object, such as a mechanical part, it is often sufficient and expedient to build only a hollow shell of the object without filling the interior. Thus, given a three-dimensional solid geometric model of an object, it is necessary to compute several planar slices of a shell of the object so that each slice can be fabricated by the system in sequence. However, computing the shell of the solid first before slicing it into several layers is generally undesirable in that a significant amount of time required to compute the shell of a three-dimensional solid.

It is thus one object of this invention to overcome this problem by combining the slicing and the shelling operations, and to interleave the computing task with the part building task.

It is a further object of this invention to provide an object fabrication system that operates in a pipelined manner by computing a next slice of a shell of a solid in parallel with the fabrication of a previous slice.

SUMMARY OF THE INVENTION

The foregoing and other problems are overcome and the objects of the invention are realized by a rapid prototyping system that interleaves the planning and building phases on a slice-by-slice basis so as to reduce a total time that is required to generate a finished part.

Beginning with a Computer Aided Design (CAD) model of an object, the method reduces the overall time to produce a shell of that object with a rapid prototyping machine. This reduction in time is achieved by interleaving the computation and the building tasks and by not requiring an explicit evaluation of the shell of the solid at the outset. The method is shown to operate with STL data directly, and can also be employed to create non-planar objects, such as models of sheet metal parts that are represented only as surfaces. Furthermore, the method can be employed to produce a smooth outer surface even when employing polyhedral approximations to the surfaces of the object.

More specifically, this invention provides a method for operating a system to fabricate an object from a computer-generated specification of the object. The method includes the steps of: (a) processing the computer-generated specification of the object to determine a first slice through the object; (b) operating the system to initiate the fabrication of the object in accordance with the determined first slice; and, during the step of operating, (c) determining at least one further slice through the object for subsequent fabrication by the system.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a flow chart that illustrates a method of this invention;

FIG. 4 is a block diagram that illustrates in greater detail the deposition controller of FIG. 1;

FIG. 6 is an illustration of a representation of a portion of the solid of FIG. 2a.

DETAILED DESCRIPTION OF THE INVENTION

Figure 1:
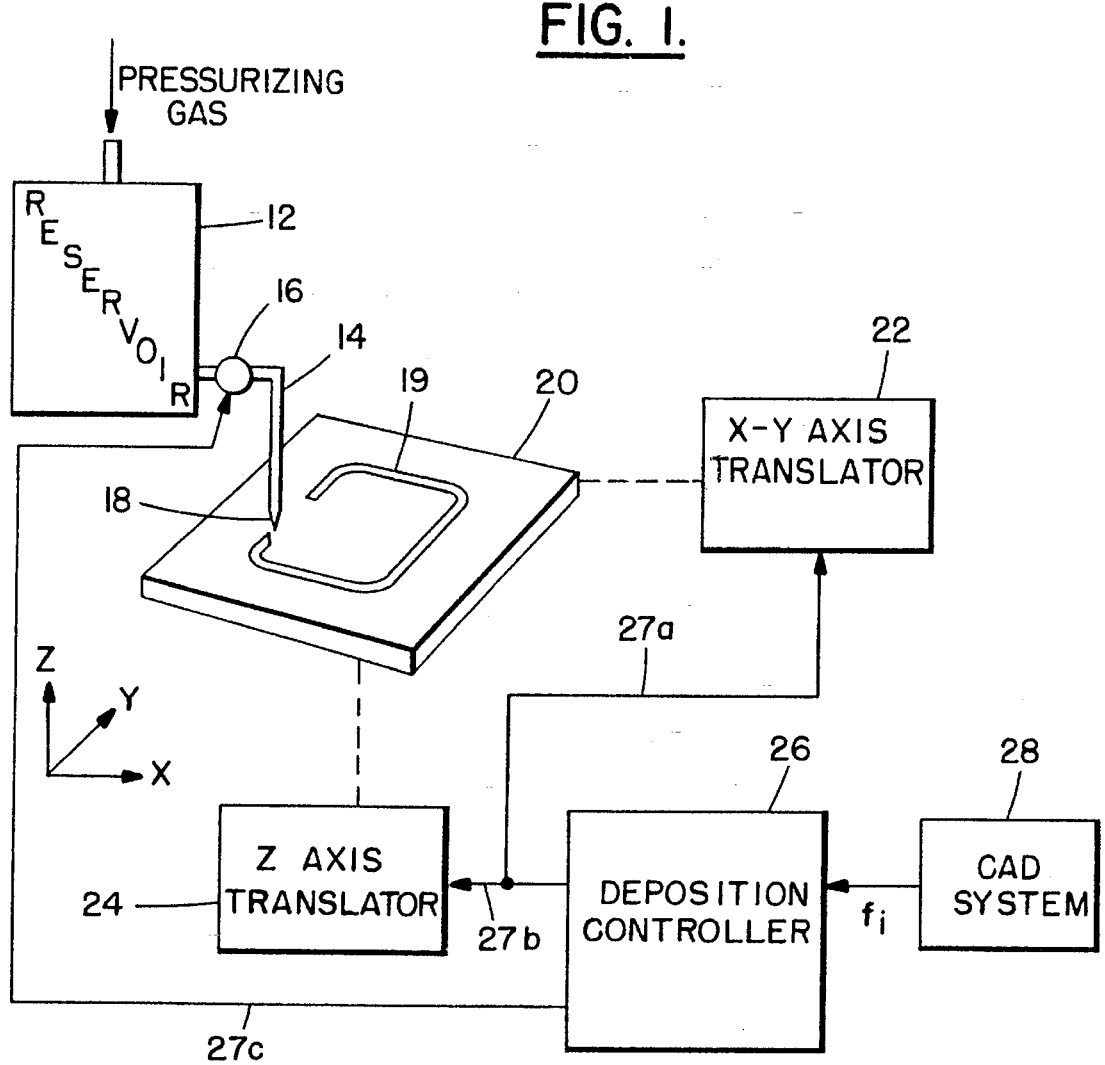
FIG. 1 is a block diagram of an embodiment of a rapid prototyping system that is suitable for practicing this invention.

FIG. 1 is a block diagram that illustrates a rapid prototyping system 10 that is suitable for practicing the invention. A reservoir 12 holds a quantity of modelling material 12a, such as a hot melt adhesive. The reservoir 12 is pressurized through the introduction of a pressurizing gas, such as air. An outlet conduit 14 includes a valve 16 for stopping and starting the flow of material 12a through the conduit 14. The conduit 14 terminates in a nozzle 18 through which the material 12a is extruded, thereby forming a bead 19 of extrudate upon or above a supporting surface of a table 20. Table 20 is coupled to an x-y axis translator 22 and a z-axis translator 24 for being precisely positioned within an xyz-coordinate reference frame, thereby enabling beads of material to be stacked vertically one upon another. A deposition controller 26 controls the positioning of the table 20, via output signal lines 27a and 27b, and the action of the valve 16, via output signal line 27c, so as to extrude the material 12a to form, in a layer-by-layer fashion, a model of a solid object, such as a mechanical part. The specification of the model is obtained from a CAD system 28, and may be expressed in an STL or other suitable format. STL is described in, by example, an article entitled "Chrysler Compares Rapid Prototyping Systems" by Terry Wohlers, Benton Publications, pages 84–90 (October 1992).

Figure 2A:
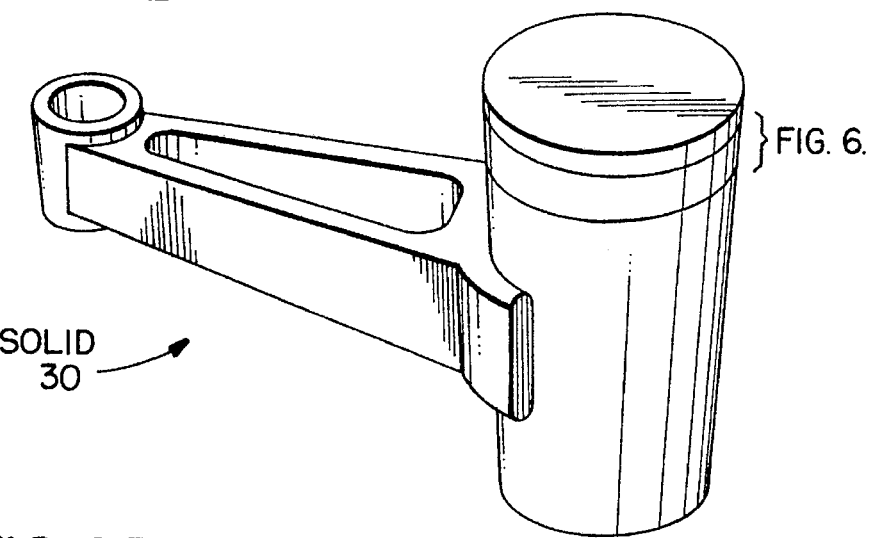
FIG. 2a is a representation of a solid as defined within a CAD system database.
Figure 2B:
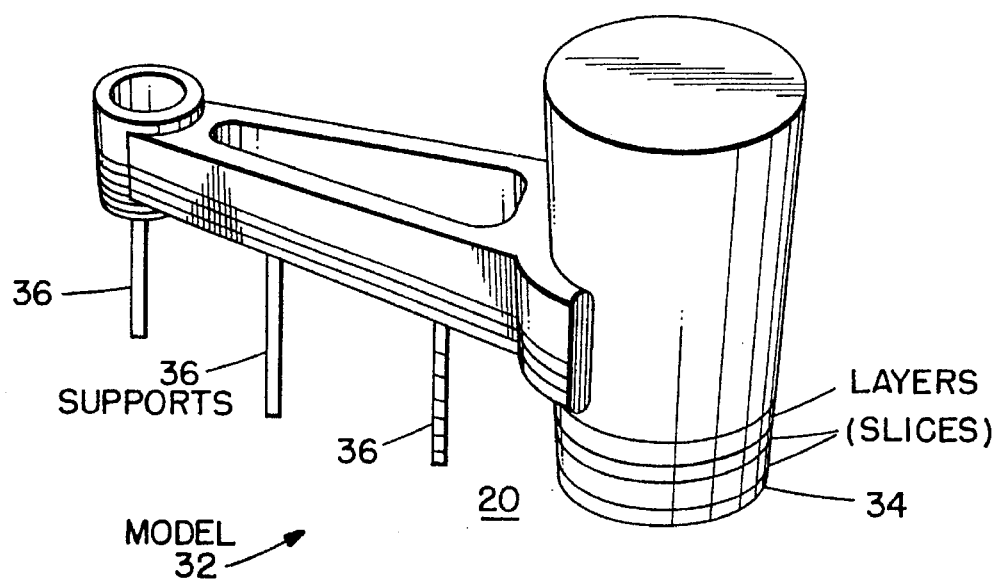
FIG. 2b is an elevational view of a model of the solid of FIG. 2a that is produced by the system of FIG. 1.

FIG. 2a is a depiction of a solid (S) as it is specified in a database of the CAD system 28. FIG. 2b is an elevational view of a three dimensional model 32 that is generated from the specification of the solid S by the operation of the system 10. As can be seen, the model 32 is comprised of a plurality of stacked layers 34 (only a few of which are shown in FIG. 2b). Each layer 34 is comprised of at least one bead 19 of the extruded material, and corresponds to a slice of the solid S. A number of external supports 36 may also be formed with the model 32 so as to temporarily support portions of the model 32 as it is fabricated. The external supports 36 are typically trimmed away after the model 32 is completed and removed from the surface of the table 20. One or more internal supports (not shown) may also be provided, as will be described below.

A presently preferred method for operating the system 10 to fabricate the model 32 is now described with respect to the flowchart of FIG. 3. It should be realized, however, that the teaching of this invention is not limited for use only with a system that extrudes a layer or bead of polymeric or other type of material. That is, the teaching of this invention may be applied to advantage by a number of types of systems that incrementally form an object in a layered, additive manner. Such systems include, but are not limited to, photopolymerization and laser sintering systems.

Before describing the method of this invention in detail, a number of terms and operations are first defined.

1. A distance $d(p,q)$ between two points p and q is considered to be the Euclidean distance between them.
2. A distance $d(p,S)$ between a point p and a set S is the minimum distance between p and any point in S, i.e., $d(p,S) = \inf_{q \in S} d(p,q)$.

3. clS denotes the closure of set S, and $\partial S$ denotes the boundary of S.
4. A solid is a regular set; i.e., it is equal to the closure of its interior. A solid need not be connected, nor is it required that its boundary be a manifold.
5. Each connected component of a solid has as its boundary one exterior surface, and possibly one or more interior surfaces which bound voids. After a solid is built the interior surfaces cannot be reached from outside the solid.
6. A shell of thickness t of a solid S is the set of points in S that are within a distance t from the boundary of S, i.e., $\text{Shell}(S,t) = \{p \in S : d(p, \partial S) \leq t\}$.

7. The shell of a connected component of a solid need not remain connected. The boundary of a shell usually has one or more interior surfaces. The newly created components of the boundary of a shell of a solid can be obtained from the trimmed interior offsets of the boundary of the solid.
8. A slice of a solid S with a plane (slab) P is the intersection of the solid with the plane (slab), i.e., $\text{Slice}(S,P) = S \cap P$.

A slab is defined to be a solid bounded by two parallel planes.
9. $B_r$ denotes an open ball of radius r, centered at the origin, i.e., if o is the origin then $B_r = \{p : d(o,p) < r\}$.

10. The Minkowski sum of two sets P and Q is:

$P \oplus Q = \{p+q : p \in P, q \in Q\}$.

A particular case of the Minkowski sum is the dilation of a set S by an amount r, and is defined to be $S \oplus B_r$. All Minkowski sums that are referred to herein are dilations. The boundary of a dilated solid can be obtained from the trimmed offsets of the boundary of the solid.

A shell of a solid can be created by a Minkowski sum and an intersection operation, as will be described below. The Minkowski sum operation and the closure operation distribute over the union operation. The invention takes advantage of this property by expressing the boundary of a solid as a union of simpler elements such as faces, edges, and vertices, whose Minkowski sums can be computed readily. It should be noted that the faces need not be flat. More precisely, by denoting the faces, edges, and vertices generically as open sets $e_i$, the following property is obtained.

Property 1:
$$\begin{aligned}\text{Shell}(S, t) &= S \cap cl(\partial S \oplus B_t) \\ &= S \cap cl\{(\cup e_i) \oplus B_t\} \\ &= S \cap cl\{\cup(e_i \oplus B_t)\} \\ &= S \cap \{\cup cl(e_i \oplus B_t)\}\end{aligned}$$

Apart from the well-known Boolean union and intersection operations, the only other operation involved in computing the shell of a solid is the Minkowski sum of its boundary element $e_i$ with $B_t$. Moreover, since the union of closures of $e_i \oplus B_t$ is determined in the last expression of Property 1, it is sufficient to restrict $e_i$ to only the faces of $\partial S$. Techniques to compute such individual Minkowski sums are known from, by example, "Exact offset procedures for simple solids", by R. T. Farouki, Computer Aided Geometric Design, 2:257–259 (1985).

However, obtaining the unions of such Minkowski sums is typically a computationally expensive process. Since there can be many boundary elements in $\partial S$, each of which gives rise to a solid after the Minkowski sum with $B_t$, and in that the three dimensional solids are to be unioned, it requires a considerable amount of time to compute the shell.

In a conventional sequential approach, the shell is first computed. Subsequently, the shell is sliced sequentially from bottom to top, and these slices are sent to the rapid prototyping system for production. In this conventional sequential planning and building cycle, the time spent in first computing the entire shell adds incrementally to the total time that elapses between submitting a geometric model of the part to the system and having a finished model in hand.

In accordance with this invention, the total time is significantly reduced by employing the observation that only the slices of the shell are required, and by employing the observation that these slices need not all be computed before initiating the model fabrication task. That is, it is possible to compute a slice of a shell of a solid without explicitly evaluating the shell of the solid. This can be seen formally in the following property.

$$\begin{aligned}\text{Slice(Shell }(S, t), P) &= P \cap \text{Shell}(S, t) \\ &= P \cap S \cap \{\cup_i cl(f_i \oplus B_t)\} \\ &= [P \cap S] \cap [P \cap \{\cup_i cl(f_i \oplus B_t)\}] \\ &= [P \cap S] \cap [\cup_i \{P \cap cl(f_i \oplus B_t)\}],\end{aligned}$$

Property 2:

where $f_i$ is a face of $\partial S$. Property 2 is valid because the intersection operation can be distributed over the unions. This results in two advantages:

1. P will typically intersect only a small number of the individual Minkowski sums of $f_i$, and $B_t$. If these intersections are determined a priori by geometric reasoning, the time for slice computation is reduced considerably.
2. If P is a plane, then the unions in the last expression of Property 2 reduce to two-dimensional operations, which can be performed significantly faster than their three-dimensional counterparts. If P is a slab, there exists a still relatively simpler problem than the full three-dimensional case. In the SliceShell method described below, each $P \cap cl(f_i \oplus B_t)$ is referred to as a primitive slice.

A presently preferred method to determine a slice of a shell is now described. The input solid is assumed to obey an important, but not unreasonable, restriction.

Specifically, it is assumed that each connected component of a given solid has a stable pose, and is well supported (by the addition of external support structures, if necessary). The solid is also assumed to be positioned in an xyz-coordinate reference frame, and the shell of the solid will be built in a sequence of layers that are perpendicular to the z-axis.

These assumptions apply to the following description of a presently preferred method for determining a specification of each slice of the shell of an object. Reference is also made to flowchart of FIG. 3, wherein the Block designations correspond to the alphabetic designations given below.

Method SliceShell

Input: A solid S, shell thickness t, and a query location $z_q$ (query interval $I_q$) of a slice plane (slab) P.

Output: Slice of the shell of S.

A. Preprocess:

(a) For each face $F_i \in \partial S$, construct its bounding z-interval $I_i = [z_{imin}, z_{imax}]$.

(b) For all i, construct an enlarged interval:

$$I_i + = [z_{imin} - t, z_{imax} + t].$$

(c) Build an appropriate data structure, such as a priority queue, for the enlarged intervals I+ so as to answer efficiently the queries of Step 2b given below.

B. Search and Slice:

(a) Initialize a set of primitive slices $\Pi$=NULL.

(b) For each interval $I_i$+ that contains the query point $z_q$ (that overlaps with the query interval $I_q$), add $P \cap \{cl(f_i \oplus B_t)\}$ to $\Pi$.

C. Merge:

(a) Union all of the primitive slices in $\Pi$ to obtain $\Sigma$.

(b) Return $(P \cap S) \cap \Sigma$.

The end result of the operation of the above-described SliceShell method is the generation, for each slice of the object, of planar regions bounded by curves. These planar regions for a given slice are further operated upon by the system 10 to plan a trajectory for the extrusion nozzle 18.

The size of the enlarged intervals $I_i^+$ is a function of the input CAD model, while the size of $z_q$, in the vertical (z-axis) dimension, is a function of the layer deposition characteristics of the system 10. By example, for an extrusion nozzle 18 that deposits a bead 19 having a thickness of 0.025 inches, the dimension of $z_q$ is set accordingly.

Figure 6:
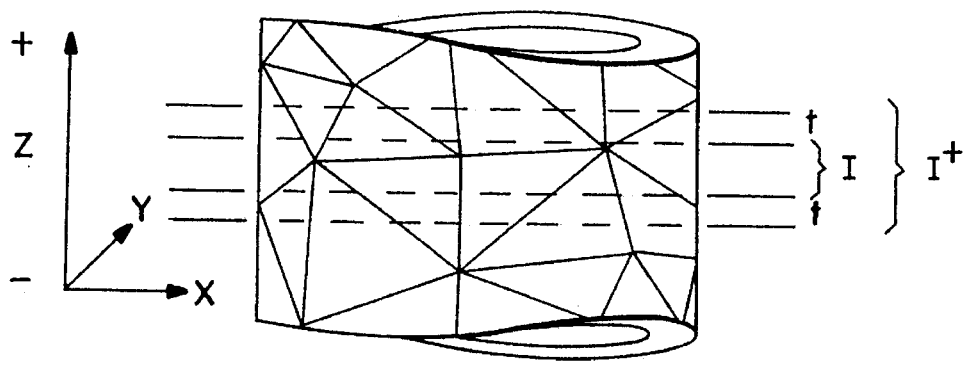

FIG. 6 illustrates a portion of the solid 30 of FIG. 2a, and shows the specification of the solid 30 as a plurality of triangles that are oriented in an xyz-coordinate reference frame. One interval (I) and its corresponding enlarged interval (I+) are also shown. As described above with respect to the preprocessing step (A), t is made equal to the thickness of the shell of the finished three dimensional structure or model 32 of FIG. 2b.

The preprocessing step (A) is intended to facilitate the pruning in the search phase of step Bb. In practice, several slices are required from bottom-to-top. This implies that several query points (query intervals) are processed by the SliceShell method. Therefore step Ac is implemented to accommodate several query points. The preprocessing step is carried out only once, and steps B and C are repeated to obtain each slice. Step Ca is preferably implemented so as to obtain an efficient union of the primitive slices. This can be accomplished using known techniques.

The sequential calculation of slices by sweeping a plane in one direction, without backtracking, enables the SliceShell method to be viewed as a sweep plane technique. The sweep plane moves from bottom to top, and an event occurs when an interval $I_i$+ first encounters the sweep plane. This signals the birth of an event, and this event is added to the priority queue mentioned above in Step Ac. All relevant attributes of the event, including the Minkowski sum $f_i \oplus B_t$, may be evaluated at that time and stored with the event in the priority queue. All calculations associated with steps B and C are then restricted only to those events in the priority queue. When the sweep plane leaves an interval $I_i$+, it will never encounter the interval again. This signifies the death of that event, and the event along with its attributes are deleted from the priority queue. The birth and the death of an event may be determined efficiently by maintaining two ordered lists of the lower and upper limits, respectively, of the enlarged intervals in step Ac.

In some cases, such as the specification of a sheet metal part, the input is not a solid but a surface having an associated thickness. If such is the case, then the only modifications to the SliceShell method are to replace step Cb by "Return $\Sigma$", and to set t to be one half of the specified thickness for the finished model.

Use of polyhedral approximations

In practice, for a solid input a considerable savings in computation is achieved by the use of a polyhedral approximation to S in portions of the method.

If $\hat{f}_i$'s denote the flat faces of such an approximation to S, it is advantageous to replace "$(f_i \oplus B_t)$" in step Bb with "$(\hat{f}_i \oplus B_t)$". This may introduce some "roughness" to the interior shell surface, which will, however, remain completely occluded in the final part. The outer shell surface, however, retains its fidelity due to the presence of the original solid (S) in step Cb.

There are cases where the input solid itself is in polyhedral form. When the input is obtained in STL format, the only available data are the faces $f_i$'s of the boundary expressed as oriented triangles (FIG. 6), each having an outward normal. The SliceShell method described above is ideally suited for operating with this type of input.

The savings in the resulting computations in steps Bb and Ca are sufficiently great to warrant this relatively simple modification in step Bb to the SliceShell method. Moreover, many existing geometric modeling systems support the Minkowski sum operations on polyhedral objects, at least in the guise of sweeps.

In some applications a part can be fabricated sequentially with non-planar layers. By example, the beads 19 of extrudate may be deposited in an out-of-plane, for example arctuate, fashion. The method accommodates this case by first determining a slab P within which the non-planar surface is contained, and then executing the SliceShell method with this slab. In step Cb, the operation P∩S is replaced with the intersection of the non-planar surface with S.

The description of the invention thus far has not touched upon an important aspect of the operation of rapid prototyping systems; specifically, the use of support structures to sustain the incremental building with layers. It may be assumed that the input solid to the SliceShell method contains the required support structures. However, since the method avoids the explicit computation of the shell of the solid, it is typically necessary to provide one or more supports for the shells so they can be built. Such supports are referred to herein as internal supports.

First, it is assumed that a procedure is available for constructing the external supports 36 of FIG. 2b. Conventional systems produce supports for faces whose outward pointing surface normals have a negative z component. However, if the direction of the surface normals is reversed, internal support structures for the boundary are produced. These internal support structure can be used to support a shell of the solid with minor modification. All that is required is that these supports, both internal and external, be sliced by P, and the resulting planar regions be unioned with the output of the SliceShell method.

The justification for employing the boundary of the input solid to compute supports for a shell of the solid is provided in part by the following properties.

Property 3:

If a local minimum of a z-value is attained at an unsupported (from below) point p in the interior offset surface of the boundary of a shell of a solid S, then the point on ∂S vertically above p also achieves a local minimum for its z-value.

It should be noted that the converse of the above property is not true. Thus, a conservative approach is taken by tracking the points of ∂S that achieve local minima.

Property 4:

The normal direction at any point p on an offset surface is the same as the normal direction at the point q on the original surface from which p emanated.

FIG. 4 is a block diagram that illustrates in greater detail the construction of the deposition controller 26 of FIG. 1. A preprocessor 26a receives the faces of S from the CAD system 28, including any required external or internal supports, and operates in accordance with the Steps Aa, Ab, and Ac of FIG. 3 to determine the enlarged intervals $I^+$ of a solid S. The preprocessor 26a operates with storage devices 26b and 26c, which store the ordered lists of the lower and upper limits for each interval, and also with a priority queue 26d that stores the enlarged intervals for access by a search and slice processor 26e. Processor 26e operates in accordance with Steps Ba and Bb of FIG. 3 to construct the set of primitive slices within a storage device 26f. An adder 26e' is employed to add P∩{cl($f_i$⊕$B_t$)} to the set of primitive slices Π stored in the storage device 26f. A merge processor 26g is coupled to the storage device 26f and operates in accordance with Steps Ca and Cb of FIG. 3 to union the primitive slices and to return, for each slice of the solid, one or more planar regions bounded by curves. The output of the merge processor 26g is provided to a tool trajectory planning processor 26h which specifies and executes the required relative motions between the fabrication tool, in this case the extrusion nozzle 18, and the table 20. During the operation of planning processor 26h the search and slice processor 26e and the merge processor 26g are enabled to specify a next slice for fabrication, and thus operate in parallel with the planning processor 26h.

Figure 5:
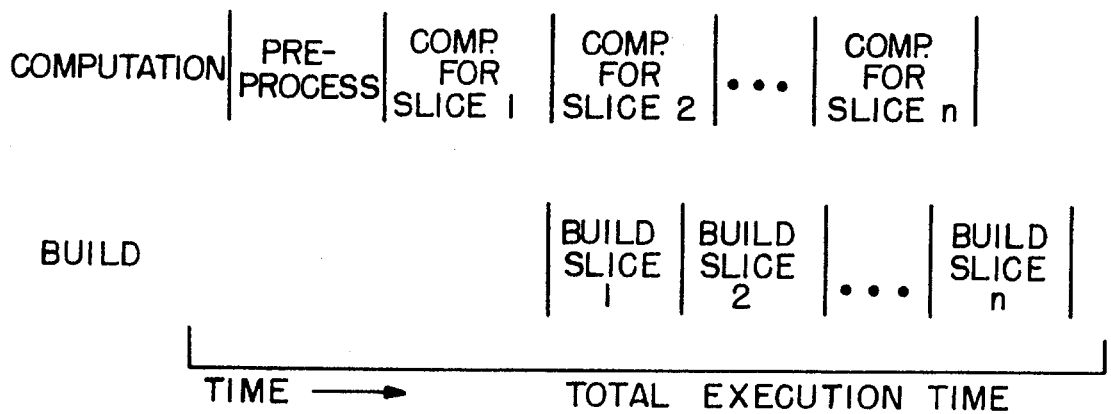
FIG. 5 is a logic flow diagram that illustrates the planning and fabrication processes being interleaved with one another during the construction of a three-dimensional object.

This important feature of the invention is shown in the diagram of FIG. 5, which illustrates the interleaving, or pipelining, of the computing and building tasks in the rapid prototyping system 10 of FIG. 1. It can be seen that by interleaving the planning task with the building task the overall time to construct the model is reduced, in that the time required to perform the planning task is not incrementally added to the time required to actually fabricate the model.

In practice, more than one slice may be computed during the time that a previously computed slice is being fabricated by the system 10. The number of slices that are computed during one build cycle is a function of the operating speed of the system 10. If more than one slice is computed, the computed slices are queued in bottom-to-top order for subsequent delivery to the planning processor 26h.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. A method for operating a system to fabricate a three dimensional object from a computer-generated specification of a solid S, the computer-generated specification of the solid S being oriented in an xyz-coordinate frame and having a height along the z-axis, comprising the steps of:

(a) preprocessing the computer-generated specification of S, the step of preprocessing including the steps of, for each face $f_i$ lying on a boundary of the solid S, constructing a bounding z-axis interval $I_i=[z_{imin}, z_{imax}]$;

for all i, constructing an enlarged interval $I_i+=[z_{imin}-t, z_{imax}+t]$, where t is a thickness of a shell of S; and storing the enlarged intervals I+ for subsequent access;

(b) searching the stored enlarged intervals to determine a specification of one slice of the shell of S, including the steps of, initializing a set of primitive slices Π=NULL; and for each interval $I_i+$ that contains a query point $z_q$ that overlaps with a query interval $I_q$, adding P∩{CL($f_i$⊕$B_t$)} to HΠ, where P is a slice plane, cl indicates a closure, and $B_t$ is an open ball of radius t;

(c) merging the set of primitive slices by performing a union of all of the primitive slices in Π to obtain Σ; and (d) returning (P∩S)∩Σ as the specification of one slice of the shell of S, including providing the specification of the one slice of the shell of S to a material deposition means for fabricating portion of the object in accordance with the specification of the one slice; and (e) thereafter operating the system to deposit material by said material deposition means to fabricate a portion of the object in accordance with the specification of the one slice.

2. A method as set forth in claim 1 wherein the step of returning includes a step of providing the specification of the one slice of the shell of S to a means for fabricating a portion of the object in accordance with the specification of the one slice.

3. A method as set forth in claim 2 wherein, after providing the specification of the one slice to the fabricating means, and before the fabricating means completes the fabrication of the portion, the steps (b), (c), and (d) are performed again for determining a specification of a next slice of the shell of S.

4. A method as set forth in claim 1 and including an initial step of receiving the specification of S in an STL format.

5. A method as set forth in claim 1 wherein the faces are faces of a polyhedral approximation of S.

6. A method as set forth in claim 1 wherein a surface of the three dimensional object is non-planar, wherein P is determined to include the non-planar surface, and wherein the operation P∩S in step (d) is replaced with an intersection of the non-planar surface with S.

7. A method as set forth in claim 1 wherein, said fabricating means includes means for extruding a bead of material.

8. A method as set forth in claim 1 wherein the step of operating the system operates the material deposition means to fabricate the first portion in an additive, layered fashion.

9. A method as set forth in claim 1 wherein the step of operating the system operates the material deposition means to fabricate the first portion by extruding a material upon a surface.

10. A method for operating a system to fabricate an object from a computer-generated specification of a surface having an associated thickness, the computer-generated specification of the surface being oriented in an xyz-coordinate frame having the thickness along the z-axis, comprising the steps of:

(a) preprocessing the computer-generated specification, the step of preprocessing including the steps of, for each face $f_i$ lying on a boundary of the surface, constructing a bounding z-axis interval $I_i=[z_{imin}, z_{imax}]$;

for all i, constructing an enlarged interval $I_i+=[z_{imin}-t, z_{imax}+t]$, where t is one half of the thickness; and storing the enlarged intervals I+ for subsequent access;

(b) searching the stored enlarged intervals to determine a specification of one slice of a shell of the surface, including the steps of, initializing a set of primitive slices Π=NULL; and for each interval $I_i+$ that contains a query point $z_q$ that overlaps with a query interval $I_q$, adding P∩{cl($f_i$ ⊕$B_t$)} to Π, where P is a slice plane, cl indicates a closure, and $B_t$ is an open ball of radius t;

(c) merging the set of primitive slices by performing a union of all of the primitive slices in Π to obtain Σ; and (d) returning Σ as the specification of one slice of the shell of the surface, and providing the specification of the one slice of the shell to a material deposition means for fabricating a portion of the object; and (e) thereafter operating the system to deposit material by said material deposition means to fabricate the portion of the object in accordance with the Specification of the one slice of the shell.

* * * * *